May 17, 1955     H. C. SOEHNER     2,708,296
METHOD OF MAKING PLYWOOD AND A PRODUCT THEREOF
Filed March 18, 1949     2 Sheets-Sheet 1

Inventor
HOWARD C. SOEHNER
By John L. Milton
Attorney

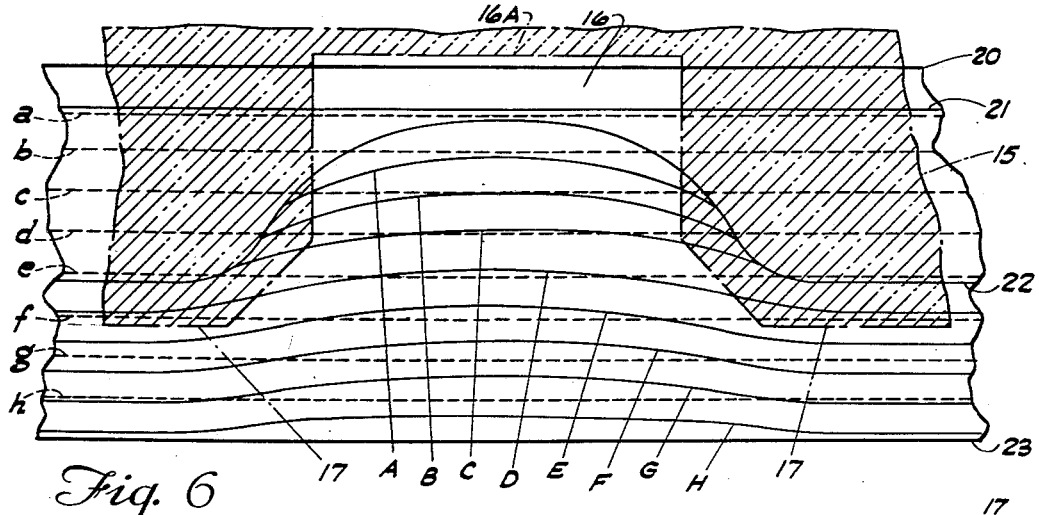
Fig. 6
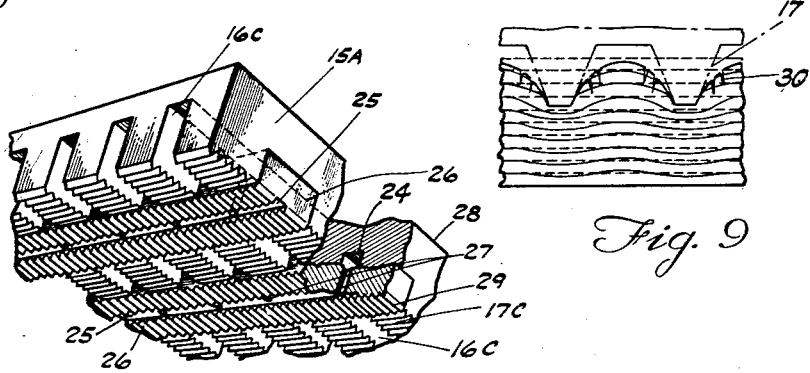
Fig. 7
Fig. 9
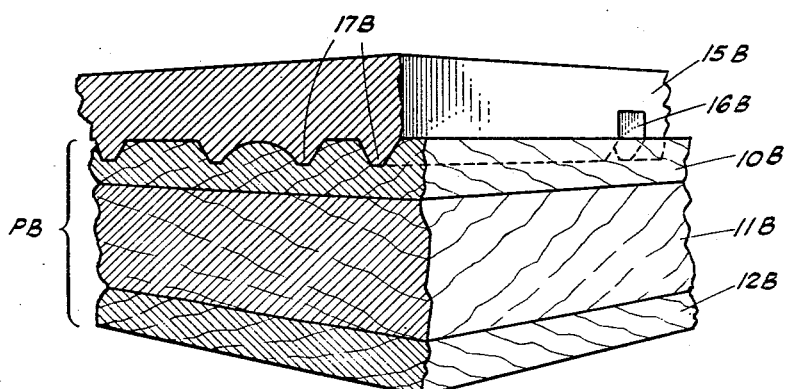
Fig. 8
Inventor
HOWARD C. SOEHNER
By John L. Milton
Attorney

United States Patent Office 2,708,296
Patented May 17, 1955

2,708,296

METHOD OF MAKING PLYWOOD AND A PRODUCT THEREOF

Howard C. Soehner, Louisville, Ky., assignor to The Mengel Company, Louisville, Ky., a corporation of New Jersey Application March 18, 1949, Serial No. 82,103

5 Claims. (Cl. 20—89)

This invention relates to plywood panels and laminated products in which is employed at least one wood veneer.

In the manufacture of laminated panels, comprising wood veneers, and more particularly where wood veneers having a moisture content near or above the fibre saturation point (hereinafter sometimes referred to as "wet veneer") and the laminae of these veneers are bonded in hat plate presses the composite structure resulting has internal stresses built into it due to the shrinkage forces set up by the removal of moisture below the fibre saturation point but restrained from appreciable variation by anchoring the exterior lamina to a platen of the press employed to effect a bond. Panels made by such a process from many species of wet veneer do not present any different appearance than plywood manufactured by conventional processes using veneers of low moisture content. Also many species of wood such as the so-called soft woods such as yellow pine, fir and the like have, especially in veneer form, relatively little cohesive strength, and when laminated by conventional methods, in hot plate presses or other methods using heat, produce panels prone to checking and splitting. Some hardwood species having above average shrinkage characteristics produce like effects.

It is well known that wood when dried below fibre saturation point shrinks considerably. This shrinkage varies with different species and also varies in degree or value in a particular species as to grain direction. The shrinkage parallel to the grain is quite small, tangentially it is considerable and radially not usually so great. This shrinkage occurs in veneers as well as in other forms of wood. Removal of so-called free moisture or cell held moisture does not result in shrinkage; however, moisture removal from the wood fibres themselves does produce shrinkage and this shrinkage continues until all fibre held moisture is removed. When plywood is made with outer plies having a moisture content near to or substantially above the fibre saturation point at the time of pressing and the bond between juxtaposed plies is formed with the outer ply or plies restrained from shrinking, there is induced into the product so formed the normal shrinkage forces. This is in contrast to drying wet veneer under normal procedure as it shrinks materially because the shrinkage forces persist until spent. Therefore, in order to produce satisfactorily a bond, where the outer ply is a wet veneer, it is necessary to remove moisture so that the moisture content in the finished or completed panel is approximately 5% or 6%, based on oven dry weights. Thus, these shrinkage forces are existing in products of such a process but have not been released as in normal free drying due to the restraining action of the pressure applied by the clamps or platens involved in the process of causing adhesion between the component layers.

However in plywood so constructed the shrinkage forces in the face plies set up by the removal of moisture are considerable and persistent until equalized; and since the grain direction of these face plies is perpendicular to the grain direction of the adjoining ply the extremes of shrinkage forces are at work; and upon aging, fine and coarse fissures (identified in the industry, respectively as checks and splits) result directly from the shrinkage forces that inevitably tend to contract the outer plies particularly in a direction perpendicular to the grain of said plies. Since the bottom portions of the fibres of these outer plies are anchored to an adjacent lamina by an adhesive that is stronger than the shrinkage forces set up by the drying or removal of moisture, are thus not free to move while the outer, particularly the top portions thereof, after removal from the pressing apparatus are free except for their natural cohesive forces, which forces may for a short time resist but eventually become weaker than the shrinkage forces; hence the resulting objectional surface checks and cracks. These checks and cracks being relatively wide at the face plane tapering into the adhesive line; the resultant weakening and tearing apart of the inner portion of the face being a myriad of fine fissures between the torn fibres. The degree of checking being dependent upon the resultant balance between the natural cohesive strength and the shrinkage forces set up and generally are proportional in any one species to the amount of fibre moisture removed while the veneer is held in restraint.

The objects of this invention are:

1. The making, on a commercial production basis, of stable plywood panels and laminated products from veneers that will retain substantially their original areas and a planar state indefinitely by reason of the fibres thereof having been deprived of their natural properties that cause warpage, twisting and shrinkage.

2. The production, on a commecial production basis, of plywood panels from wet veneers that will not develop noticeable checks or splits in the surface of finished panels as effected by the caul plates as they are removed from the press, thereby eliminating surface sanding.

3. To provide a method or process of manipulating apparatus, on a commercial production basis, for artificially arranging the fibres of wet veneers and an adhesive therebetween while being consolidated into plywood panels in a hot press wherein said fibres are rendered powerless to cause shrinkage during manufacture and shrinkage or warping during the life of the completed panels.

4. The making of plywood panels, as designated in objects 1, 2 and 3, that will possess mechanical strength substantially equal to plywood produced from the same kind of materials by conventional procedure.

My new process employs a patterned caul board provided with flat faced tooth like projections which are forced through the outer surface of the face ply parallel with the fibres sufficiently to compact some of the fibres in the bottoms of the depressions or cuts. These depressions or cuts in the face ply are not continuous but are interrupted by a multitude of fibre bridges which provide a cohesiveness to the face. These bridges being small enough so that the fibres in the bridges can be expanded or stretched without appreciably (i. e., as far as visible observation is concerned) rupturing and thus retaining in these portions a large part of their natural cohesive strength. The degree of stretch in these bridges being equal to the amount of expansion deformation affected by the raised or relieved pattern produced by the special caul board involved.

The deforming action serves to relieve the normal shrinkage stresses of the entire area of the ply by adding compressed or extra fibres to the inner section of the face ply, thus setting up a compression fibre stress in the inner section of the face ply thus relieving the normal tension fibre stress in this section of the face; at the same time the tension stresses normally set up in the outer section of the face ply under conventional procedure are mechanically relieved by the expansion action of this face deformation.

Apparatus whereby this method of making plywood may be performed and examples of the product thereof are exemplified in the accompanying drawings in which:

Fig. 6 is a schematic cross section on a greatly enlarged scale of one of the fibre bridges taken on 6—6 of Fig. 1 and designated by numeral 14. The normal cross hatching of the ply has been omitted.

Fig. 7 is an isometric view of an alternate or modified type of caul board used to produce some types of patterns.

Fig. 8 is an isometric view of another form of pattern, producible by the teachings hereof.

Fig. 9 is a cross sectional view of a face ply showing two teeth of the caul plate having penetrated a wet veneer but not forced to the final stage of formation.

Figures 1, 2:
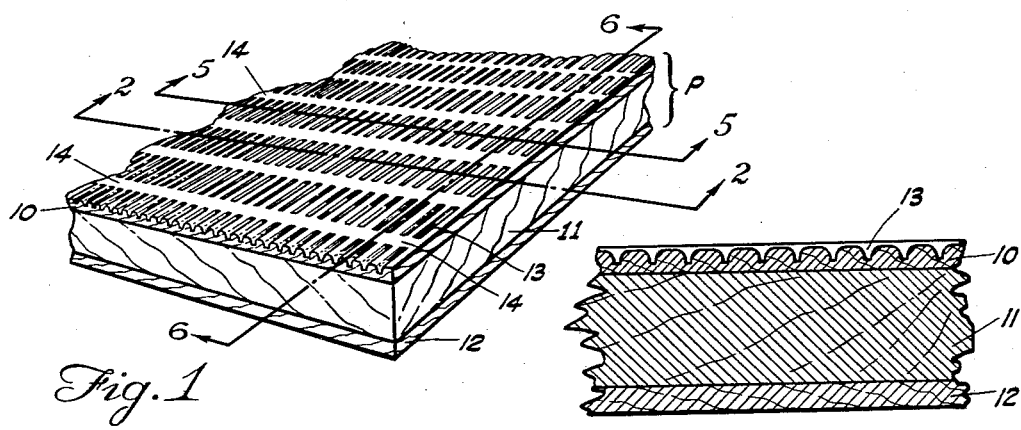
Fig. 1 is an isometric view of a portion of a panel produced by this method.
Fig. 2 is a vertical cross section taken at line 2—2, Fig. 1.

In Figs. 1 and 2, numeral 10 designates a veneer after it has been formed into a pattern having a series of transverse compressed bands formed by sinking teeth 17 of the caul plate 15 therein so that the root 17A of these teeth, the area between adjacent teeth will compress or "iron" the wood fibres embraced thereby to form ridges while the ends of the teeth likewise form indentations 13. Fig. 2 shows all of the ridges compressed sufficiently to fall below the former surface of the veneer. Between these indentations are portions of bridges 14. Numeral 11 designates the core and 12 the back veneer of a small portion of plywood panel P. It should be noted that indentations 13 are disposed in parallel relation to the grain of veneer 10.

Figures 3, 4:
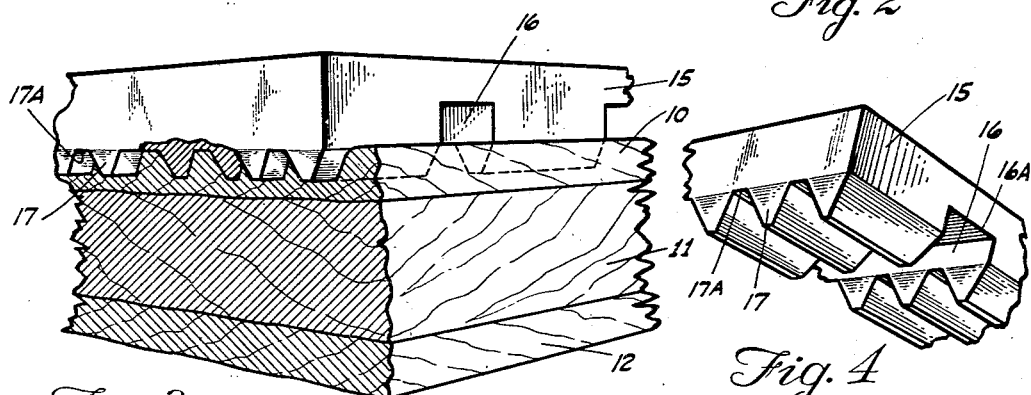
Fig. 3 is an isometric view, on an enlarged scale, of a portion of the caul plate impressed in the top veneer of the panel shown in Fig. 1.
Fig. 4 is an isometric view of a small portion of this special caul.

In a preferred procedure, as shown by Fig. 3, teeth 17 of the caul plate are shown sunken entirely so that the base or root faces therebetween engage the outer surface of veneer 10 thereby gripping or anchoring the latter against movement during the bonding cycle of forming the plywood panel. Transverse channels 16 are cut materially deeper in the caul plate so that the flat top portions are clear of said outer surface and thus provide an escape passage for steam and vapor that is delivered thereto by the myriad of minute capillary ducts between the fibres. As shown in the drawings these transverse channels have a depth which is greater than that of the depressions or valleys between the teeth and thus freely communicate with the ambient atmosphere even when the caul teeth are sunken completely into the veneer. Obviously, steam is generated when the heated caul plate engages the wet veneer and is free to pass to the channels. Since the areas embraced by these channels are very narrow, about equal to the thickness of the veneer, and not contacted by top surface 16A thereof, the short wood fibres of the bridges 14 formed thereby are localized and the edge areas thereof are cut or torn by the edges of the teeth, they are free to shrink during the bonding cycle without affecting the area of the veneer in whole or part thereof.

Figure 5:
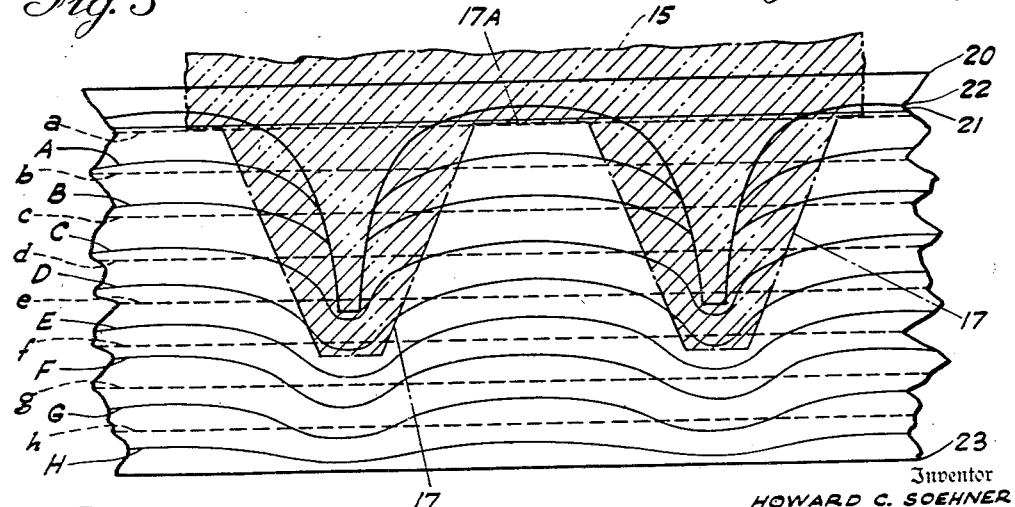
Fig. 5 is a schematic cross section on a greatly enlarged scale of a small section of the face ply taken from line 5—5, Fig. 1, to show fibre concentrations and rearrangement after pressing and the position of teeth of the caul plate during process. The normal cross hatching of the ply has been omitted.

The results of a long series of binocular-microscopic observations of a wet veneer after being subjected to the incident method of treatment with the type of caul plate shown in Figs. 2 and 3 selected to disclose my invention are graphically illustrated in Figs. 5 and 6, on a greatly enlarged scale with the cross section hatching of the veneer omitted. Such observations and examinations were made at various stages in the process as a basis for this disclosure and to enable any one versed in this or kindred arts to practice this invention. To support statements regarding advances over prior known related products similar observations and studies have been made thereof.

The hatched area in Fig. 5 represents two teeth 17 of the caul plate sunken in the face at final or full pressure. At this stage the fibres as thusly displaced, conform to the shape of the forming member. As the pressure is released, by withdrawing the caul plate, the internal compression forces set up thereby allow an elastic recovery so that the final form of the patterned surface follows the general contour as illustrated by line 22.

It should be remembered that Fig. 5 illustrates a portion of a section without cross hatching along line 2—2, Fig. 1, on a greatly enlarged scale, to show the face ply through the depressions midway between the fibre bridges; the approximate thickness of the face planes of a wet veneer ply is indicated by lines 20 and 23. The distance between lines 20 and 21 indicate the normal compression or thickness shrinkage for an identical veneer, processed under like conditions without the use of a caul plate having teeth. Line 22 indicates the surface boundary of fibres of a wet veneer after processing into the patterned face illustrated in Figs. 1 or 8. The horizontal broken lines $a$, $b$, $c$, $d$, $e$, $f$, $g$, $h$ represent several planes of adjoining fibres before pressing. The light solid lines A, B, C, D, E, F, G, H indicate the location of the fibres in the respective or corresponding planes referred to after pressing and the length of these lines compared to the length of the line in the original respective plane indicates the degree of compression. This end result is due to the partial rupturing of the natural fibre cohesion at points where lines A, B, C intersect with contour line 21; combined with the elastic reaction where portions of the veneer have not been compressed beyond the elastic limit of the localized area.

In Fig. 6, the same general type of schematic diagram is employed to show a portion of a section on line 6—6 in Fig. 1 where this line crosses a bridge 14. Thus, this figure should be considered as showing a cross section of any one of the fibre bridges, without cross hatching. In Fig. 6 the approximate thickness of the wet face before pressing as in Fig. 5 is indicated by the face planes lines 20 and 23. The distance between lines 20 and 21 indicate the normal compression of thickness shrinkage for this particular thickness and species of veneer for an unpatterned face (conventional plywood panel) when pressed under like conditions with a flat caul plate. Line 22 indicates the top surface boundary of fibres at a bridge of the patterned face illustrated. The horizontal dotted lines $a$, $b$, $c$, $d$, $e$, $f$, $g$, $h$ are again employed to represent several planes of adjoining fibres before pressing and like solid lines A, B, C, D, E, F, G, H the location of these respective fibre planes after pressing and the hatched area represent the relative position of the caul plate at full pressure.

It should be noted that the short fibres in the planes adjacent the top portions of the bridges are freed, except for their natural cohesive forces, to adjust themselves after the ends thereof are ruptured or torn while those in the lower portions thereof that are not ruptured are continuations of the highly compressed fibres that fall under the flat faces of teeth 17. This artificial arrangement of the fibres has been similarly illustrated in Figs. 5 and 6, to which reference has been made hereinbefore, while the caul plate is sunken into the wet veneer and after it has been withdrawn and the panel bonded ready for use without sanding or other surface treatment except for painting, staining or the like.

The modified caul plate 15A, Fig. 7 has been employed for producing panels having an alternative pattern. The construction of this plate illustrates a principle employing inserts 26 whereby a great variety of patterns may be produced expeditiously. Since the pressure required to separate and rearrange fibres parallel to the grain is considerably less than required to similarly displace and rearrange fibres perpendicular to the grain direction; a pattern requiring deformation in both directions, that is, parallel and at right angles to the grain direction may be accomplished through the use of this caul plate in which numeral 24 designates a plurality of venting ducts connecting directly with slots 16C being formed by said slot 16C and inserts 26 and are in free communication therewith, thus they (16C) function as ducts for the liberated steam in addition to establishing the width of the bridge elements formed thereby. Numeral 25 designates a groove in insert 26 that functions as part of the caul pattern and at the outset of the pressure cycle to channel steam to holes 27 that communicate with slots 16C. Teeth 17C which are to be sunken in a wet veneer, run parallel to the grain, project a greater distance from the base plane 28 than do teeth 29 which run perpendicular to the grain in order that proper expansion of the face may be provided.

In the other modified pattern, Fig. 8, teeth 17B are of irregular forms and spacing. In this illustration 15B represents a portion of the caul plate which could be of any practical size. The venting slot that forms the bridge is shown at 16B. The wet veneer that eventually becomes the face ply of the plywood panel is designated by 10B, the core 11B and back 12B, which three plys constitute panel PB. It should be noted from Fig. 8 that regularity of tooth shape is not a prerequisite and many forms of tooth contour may be used provided they perform the function of expanding the outer portion of the veneer ply and compressing the inner portion of this ply.

The cross sectional view, shown in Fig. 9, illustrates how the surface face ruptures when insufficient pressure is applied. In this illustration fine ruptures occur as shown at 30. This section also shows insufficient fibre compression below the teeth 17 which will result in further or subsequent checking of the surface ply upon aging.

In some patterns depth of penetration is controlled by pressure. Therefore, the expansion and compression in face fibres are variable. When sufficient pressure is not used to force the caul plate to the full depth of the pattern slight checking is experienced at the ridges which do not come in contact with the caul plate. When this occurs but sufficient pressure has been used to adequately expand and compress the face fibres, these small checks are closed sufficiently to disappear and become a permanent part of the stress equalization and do not develop further.

It has been found that using wet face veneers approximately 1/16" thick of sweet gum, patterns having depths of .015" to .045" can be used and obtain satisfactory stability of the product. I have used wet face veneers having a thickness from .035" to .175" in the process and with the instrumentalities disclosed herein, however, a general rule develops that the pattern depth should fall within the limits of 25% to 75% of the face veneer thickness.

With sweet gum having a tangential shrinkage of approximately 10% the expansion or separation of fibres parallel to the grain should be twice the normal shrinkage or 20%. This 20% minimum figure may be increased to a maximum of 80% and still maintain a stable face. The maximum space between teeth or expansion points for the best results should be 3/16" when 35% expansion is used. Greater spacing than 3/16" may be used but the effect of the expansion is thus reduced and the resulting product will develop further checks upon aging. This spacing may vary somewhat in different species depending on their natural cohesive strength which permits them to better withstand the shrinkage stresses set up on drying without rupturing, and also on those woods having less shrinkage which reduces the stress set up by drying.

The pressure factor is variable within limits. The preferred adhesive is a resin of the urea-formaldehyde phenol formaldehyde resorcinol or melamine types, and the pressure required for satisfactory bonds is the starting point. With urea glues and patterns conforming to the minimum expansion requirements pressures of 100 lbs. per sq. in. are satisfactory. For most patterns it will be found that pressures of from 200 to 350# per sq. in. will be required. Still further pressures may be used when the core material is strong enough to withstand the pressure without collapse in local areas.

The novel process disclosed herein permits quite a latitude of combinations in that the material to be processed may consist of wet or dry substances other than natural wood, likewise the back face ply can be dry or wet providing a ventilating caul is used against it. Even dry faces in soft woods such as willow are improved by this process since they are densified and stabilized so as to remove the tendency to check on aging which sometimes occurs even on conventionally made plywood.

This process also takes advantage of the plasticity of wood which is considerable under heat and pressure and especially when wet veneer is being processed. This plasticity permits a moderate flow, at least sufficient to accomplish the objectives of this invention as outlined above, and a complete artificial rearrangement of fibres without materially impairing the strength and at the same time by means of this process improves the physical stability of the face ply by relocation of fibres and equalization of stresses.

It has been found that face veneers having splits as long as 3 ft. can be used satisfactorily when processed according to this disclosure. Such splits become obliterated and are entirely invisible after a conventional coat of paint has been applied to the outer surface of the completed product. This feature conserves material that would otherwise be wasted partially, wholly or relegated to an inferior grade, thereby providing an additional economic advantage.

During the experiments that resulted in the above disclosure of my preferred embodiments of this invention, plywood was made using a caul plate in which teeth 17 had sharp knife like edges and a small included angle to the sides instead of the preferred blunt or flat faces. While such plywood was usable it lacked the full stability of properties like freedom from further development of checks and warpage. Obviously this was due to the absence or lesser degree of compressed fibres than when formed under the flat or blunt faces of teeth in the preferred caul. Sharp faced teeth may be used when the included angle of the sides of the teeth is greater than 60° which permits some compressing action by the sides of the teeth. This compressive action becomes substantially greater as the included angle becomes greater than 90°. While investigating the behavior of wet veneer when subjected to pressure through caul plates having blunt or round faced teeth in the form of lobes or protuberances to compress the fibres thereunder, according to the teachings herein, the products were found to possess properties akin to panels made from the illustrated types of caul plates. It should be noted that production of such panels require much greater pressures therefore more expense to make.

While it will be apparent that the disclosed embodiments of my invention together with the illustrated instrumentalities and types of products produced thereby are well calculated to fulfill adequately the objects and advantages primarily stated, it is to be understood that the invention is susceptible of variations, modifications and changes within the spirit and scope of the subjoined claims.

What I claim is:

1. In the manufacture of stable patterned plywood panels making use of a press having a heated caul plate the operating face of which is provided with a plurality of series of short, spaced-parallel, wedge-shaped teeth, each of said series being separated from adjacent series by channels in the caul plate having a depth greater than that of the valley portions between the teeth and extending across the face of the caul plate so as to communicate with the atmosphere even when the teeth of the caul plate are pressed into a veneer sufficiently to obstruct the valleys between the teeth; the process which comprises assembling a plurality of superposed sheets of veneer, one facing sheet of the assembly being a wet wood veneer, with an adhesive interposed between the sheets, pressing said heated caul plate against said wet facing veneer with sufficient pressure completely to embed the teeth of the caul plate in the wet veneer and to press said valley portions between the teeth directly against the face of the veneer so as to compress the veneer beneath the valley portions thereby to close and cause the disappearance of any checks and splits in the veneer, retaining said heat and pressure until the moisture in the veneer has vented itself through the channels in the caul plate and the adhesive has set, then releasing the pressure.

2. The process of claim 1 wherein the assembly of veneers is placed in the press in such manner that the caul teeth run parallel with the grain in the wet facing veneer.

3. A stable laminated plywood panel having a wood facing veneer with a plurality of artificially-formed series of short, spaced-parallel ridges separated by intermediate depressions, the said series of ridges being separated by uncompressed bands in the veneer which extend to the edges of the panel, the tops of the ridges being compressed slightly below the level of the uncompressed bands; said facing veneer being substantially free from visible checks and splits.

4. The plywood panel of claim 3 wherein the spaced-parallel ridges in several of the series extend parallel with the grain of the wood facing veneer while the ridges in other series extend transversely to the grain.

5. The plywood panel of claim 3 wherein the spaced-parallel ridges in the facing veneer extend parallel with the grain of the wood.

References Cited in the file of this patent

UNITED STATES PATENTS

| Number | Name | Date |
|---|---|---|
| 839,680 | Voigt | Dec. 25, 1906 |
| 2,268,477 | Elmendorf | Dec. 30, 1941 |
| 2,286,068 | Deskey | June 9, 1942 |
| 2,301,800 | Bersie | Nov. 10, 1942 |
| 2,363,927 | Bailey | Nov. 28, 1944 |
| 2,442,422 | Loetscher | June 1, 1948 |
| 2,514,318 | Elmendorf | July 4, 1950 |
| 2,564,055 | Elmendorf | Aug. 14, 1951 |
| 2,660,548 | Soehner | Nov. 24, 1953 |